United States Patent
Matsushima et al.

(10) Patent No.: US 11,787,225 B2
(45) Date of Patent: Oct. 17, 2023

(54) ERASING TOOL

(71) Applicant: MITSUBISHI PENCIL COMPANY, LIMITED, Tokyo (JP)

(72) Inventors: Ryosuke Matsushima, Fujioka (JP); Satoru Banzai, Fujioka (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 990 days.

(21) Appl. No.: 16/604,629

(22) PCT Filed: Apr. 11, 2018

(86) PCT No.: PCT/JP2018/015252
§ 371 (c)(1),
(2) Date: Oct. 11, 2019

(87) PCT Pub. No.: WO2018/190377
PCT Pub. Date: Oct. 18, 2018

(65) Prior Publication Data
US 2020/0101787 A1    Apr. 2, 2020

(30) Foreign Application Priority Data
Apr. 13, 2017 (JP) ................................ 2017-079766

(51) Int. Cl.
*B43L 19/00* (2006.01)
*C08K 3/013* (2018.01)
*C08K 5/00* (2006.01)

(52) U.S. Cl.
CPC .......... *B43L 19/0025* (2013.01); *C08K 3/013* (2018.01); *C08K 5/0016* (2013.01)

(58) Field of Classification Search
None
See application file for complete search history.

(56) References Cited

U.S. PATENT DOCUMENTS

2014/0150203 A1   6/2014  Banzai et al.

FOREIGN PATENT DOCUMENTS

| JP | 2007277322 A | 10/2007 |
|----|--------------|---------|
| JP | 2014111320 A | 6/2014 |
| JP | 2014-177053 A | 9/2014 |
| JP | 2017052275 A | 3/2017 |

OTHER PUBLICATIONS

Satoshi, JP 2017052275, Mar. 16, 2017 (machine translation) (Year: 2017).*
Nasukawa et al., JP2007277322, Oct. 25, 2007 (Machine translation) (Year: 2007).*
Tomita Pharmaceutical Co., Ltd, "Florite" product brochure; date accessed: Mar. 14, 2023 <https://www.pharmaexcipients.com/product/florite-r/?attachment_id=298274&download_file=yslbz3t51diar> (Year: 2023).*
Extended European Search Report dated Nov. 24, 2020, by the European Patent Office in corresponding European Patent Application No. 18785057.3-1014. (6 pages).
International Search Report (PCT/ISA/210) dated Jun. 26, 2018, by the Japan Patent Office as the International Searching Authority for International Application No. PCT/JP2018/015252.
Written Opinion (PCT/ISA/237) dated Jun. 26, 2018, by the Japan Patent Office as the International Searching Authority for International Application No. PCT/JP2018/015252.
International Preliminary Report on Patentability dated Oct. 15, 2019, by the International Bureau of WIPO in corresponding International Patent Application No. PCT/JP2018/015252. (6 pages).

* cited by examiner

*Primary Examiner* — Cheng Yuan Huang
(74) *Attorney, Agent, or Firm* — BUCHANAN INGERSOLL & ROONEY PC

(57) ABSTRACT

Provided is an erasing tool which produces no eraser crumbs and allows a progress for adsorption of even a light color of color pencil leads and the like to be recognized at a glance and which makes it possible to surely erase the color of color pencil lead and has a high light transmittance. The erasing tool is characterized by containing a secondary aggregate having a diameter of 1 to 100 μm with a petaloid particle as a primary particle.

3 Claims, No Drawings

ERASING TOOL

TECHNICAL FIELD

The present invention relates to an erasing tool which is excellent in erasability of drawn lines written by pencils, mechanical pencils, color pencils and the like and does not produce eraser crumbs and which has a light transmittance.

BACKGROUND ART

In general, erasing tools of a rubber type such as natural rubbers and synthetic rubbers, and erasing tools of a plastic type comprising plastic resins as main resins such as vinyl chloride resins are known in terms of materials for erasing tools, and usual rectangular ones, polygonal ones suitable for corner erasers and the like are known in terms of a shape. Further, erasing tools prepared by blending a matrix with various abrasives, inorganic materials and the like are known for enhancing erasability of drawn lines.

In conventional, erasing tools, used to be involved therein are the problems that eraser crumbs produced have to be collected and disposed and that the eraser crumbs which are not completely collected stain floors and so on.

Then, an erasing tool characterized by containing tubular basic magnesium carbonate which is a liquid-absorbing porous material as a blend component has been disclosed by the present applicant as an erasing tool which is excellent in erasability of drawn lines and does not produce eraser crumbs (refer to, for example, patent document 1).

Further, a composition of an erasing tool containing the tubular basic magnesium carbonate, acrylic thermoplastic resin powder and the like is disclosed (refer to, for example, patent document 2).

The erasing tool described in patent document 1 has not so far been available in terms of an excellent erasability of drawn lines and no eraser crumbs produced. Since the tubular basic magnesium carbonate used comprises a tubular structure, the erasing tool itself is opaque, and a progress for adsorption of graphite and the like in drawn lines written with an intense color such as a black color can be visually confirmed by observing the erasing tool. Further, the erasing tool described in patent document 2 does not stain a paper surface due to action of the acrylic thermoplastic resin powder, and burr is scarcely produced on a surface of the erasing tool.

However, the erasing tool described in patent document 1 involves slight problems of causing notable crushing in kneading, a rise in a viscosity in kneading, and a reduction in a liquid absorbability of the basic magnesium carbonate and erasability of the erasing tool. Further, in recent years, a lot of color pencils (leads) are commercially available, and in erasing tools which do not produce eraser crumbs and are opaque, erased colors are adsorbed and accumulated every erasing. When the color is intense such as black, the color can be recognized by a progress for adsorption thereof, but in a case of a light color, a little problem of being difficult to find adsorption is involved therein. Presently, erasing tools having such a high light transmittance that even adsorption of a light color can be found are increasingly required. Further, the erasing tool described in patent document 2 does not have as well such a high light transmittance that even adsorption of a light color can be found.

CONVENTIONAL ART DOCUMENTS

Patent Documents

Patent document 1: Japanese Patent Application Laid-Open No. 2014-111320 (claims, examples and others)

Patent document 2: Japanese Patent Application Laid-Open No. 2017-52275 (claims, examples and others)

DISCLOSURE OF THE INVENTION

Problems to be Solved by the Invention

In light of the problems on the conventional art and the present situation described above, the present invention intends to solve the problems, and an object thereof is to provide an erasing tool which produces no eraser crumbs and allows a progress for adsorption of even a light color of color pencil leads and the like to be recognized at a glance and which makes it possible to surely erase the light color and has a high light transmittance.

Means to Solve the Problems

Intense investigations repeated in order to solve the conventional problems described above and others have resulted in finding that the erasing tool which meets the object described above can be obtained by containing a compound having a specific structural characteristic as a blend component, and thus the present invention has come to be completed.

That is, the erasing tool of the present invention is characterized by containing a secondary aggregate having a diameter of 1 to 100 μm with a petaloid particle as a primary particle.

The particle described above contains preferably flakes selected from calcium silicate, calcium carbonate or calcium phosphate and composite compounds thereof. Further, a matrix component, a plasticizer and a filler are preferably contained.

The Effect of the Invention

According to the present invention, provided is an erasing tool which produces no eraser crumbs and allows a progress for adsorption of even a light color of color pencil leads and the like to be recognized at a glance and which makes it possible to surely erase the light color and has a high light transmittance.

EMBODIMENTS OF THE INVENTION

The embodiment of the present invention shall be explained below in detail.

The erasing tool of the present invention is characterized by containing a secondary aggregate having a diameter of 1 to 100 μm with a petaloid particle as a primary particle. In the present invention, the petaloid particle comprises a flaky particle assuming a petaloid structure similar to petals of rose.

In the erasing tool of the present invention, a secondary aggregate having a particle diameter of 1 to 100 μm with a petaloid particle as a primary particle is used as a component. In the present invention (including examples and the like described later), the diameter means an average diameter weighted by a volume from measuring results in a laser diffraction scattering method and can be measured by a dry method using for example Micro Truck (3100II, manufactured by Nikkiso Co., Ltd.).

The secondary aggregate having a diameter of 1 to 100 μm prepared by using petaloid particles as a primary particle and aggregating the primary particle is different from an ordinary porous substance and has very large pore radius and pore volume, and the aggregate has a light transmittance and is a liquid absorbing aggregate having a very high liquid absorption rate. The aggregate comprises particles having a liquid absorption rate of preferably 30 to 500 ml/100 g, more preferably 300 to 500 ml/100 g. The liquid absorption rate is represented by a minimum linseed oil amount obtained by dropping linseed oil on a mount of powder 100 g to turn powder from a sand dumpling state into a fluid state.

The secondary aggregate having a diameter of exceeding 100 μm is deteriorated in a feeling in erasing and therefore does not exert the effects of the present invention.

The usable secondary aggregate having the foregoing diameter with a petaloid particle as a primary particle comprises preferably the particle described above containing flakes selected from calcium silicate, calcium carbonate or calcium phosphate and composite compounds thereof, and the primary particles includes, for example, a calcium silicate petaloid porous structure, a calcium carbonate petaloid porous structure, a calcium phosphate petaloid porous structure, and a petaloid porous composite compound of calcium carbonate and calcium phosphate. The secondary aggregates satisfying the respective ranges of the diameter and the liquid absorption rate each described above and having a light transmittance are preferably used.

The concretely usable calcium silicate petaloid porous structure is so-called gyrolight form calcium silicate having a petaloid structure having large pore radius and pore volume. Calcium silicate of the above structure which has a crystal structure of $2CaO \cdot 3SiO_2 \cdot mSiO_2 \cdot nH_2O$ (m and n are positive numbers) and a molar ratio of 1.0 to 4.5 of $SiO_2$/CaO and which has a light transmittance. Calcium silicate having diameter of 100 μm or less is particularly preferred since the effects of the present invention are exerted even at a small content, but also molding can be molded at a low pressure. Commercially available products such as "FLORITE R®" and "FLORITE RT®" manufactured by Tomita Pharmaceutical Co., Ltd. can be used.

The petaloid porous composite compound of calcium carbonate and calcium phosphate is prepared by replacing calcium with phosphorus by treating ground calcium carbonate or precipitated calcium carbonate with phosphoric acid and at the same time, turning the composite into porosity, and the composite has a petaloid crystal structure and a light transmittance.

Among the petaloid particles, the calcium silicate petaloid porous structure is preferably used in terms of further exerting the effects of the present invention.

A content of the secondary aggregates having a diameter of 1 to 100 μm with a petaloid particle as a primary particle is 0.7 to 30% by mass (hereinafter referred to merely as "%"), preferably 6 to 12.5% based on a total amount of the erasing tool composition.

If the content is less than 0.7%, the erasing tool becomes too soft, and if the content exceeds 30%, the erasing tool easily produces eraser crumbs, or handling in kneading and stirring is reduced to make molding difficult, so that both are not preferred.

The matrix component, the plasticizer and the filler other than the secondary aggregate having a diameter of 1 to 100 μm with a petaloid particle as a primary particle used in the present invention are preferably contained, and various blend agents used for erasers and the like are blended, if necessary, at desired amounts to mold the mixture, whereby capable of being prepared is an erasing tool which can surely erase drawn lines written by pencils, mechanical pencils, color pencils and the like without staining a paper surface in erasing drawn lines has a high light transmittance of 30 to 40% in a case of a piece having a thickness of about 0.25 mm and can visually recognize even a little an opposite side and which can visually recognize slightly the opposite side through even a thickness of 10 mm, allows a progress for adsorption to the erasing tool even in a light color of color pencil leads and the like to be recognized at a glance and produces no eraser crumbs.

The usable matrix component shall not specifically be restricted, and at least one of, for example, various thermoplastic resins, synthetic rubbers, thermoplastic elastomers and the like can be used.

The thermoplastic resins include, for example, vinyl chloride resins such as vinyl chloride resins and vinyl chloride vinyl acetate copolymers; acrylic resins such as polymethyl methacrylate; ethylene vinyl acetate copolymers, ethylene acrylic acid copolymers, polyolefins, chloro-polyolefins and the like. The synthetic rubbers include, for example, butyl rubbers, butadiene rubbers, nitrile rubbers, nitrile butadiene rubbers, styrene butadiene rubbers, and the like. The thermoplastic elastomers include styrene elastomers, olefin elastomers, polyurethane elastomers, and the like. The particularly preferred matrix component includes the vinyl chloride resins.

The vinyl chloride resins suitably used include, to be specific, Kane Vinyl series as polyvinyl chloride (manufactured by Kaneka Corporation), Vinyca series (manufactured by Mitsubishi Kasei Vinyl Co.), Ryuron Paste series (homopolymers and copolymers: manufactured by Tosoh Corporation), and the resisns may used alone or in a mixture of two or more resins.

A content of the matrix components is preferably 20 to 60% based on a total amount of the erasing tool composition.

The usable plasticizer shall not specifically be restricted as long as the plasticizer can plasticize or gel the thermoplastic resin contained, and the plasticizer includes, for example, dioctyl phthalate (DOP, dioctyl phthalate), dibutyl phthalate (DBP, dibutyl phthalate), dioctyl adipate (DOA, dioctyl adipate), dioctyl sebacate (DOS, dioctyl sebacate), dimethyl phthalate (DMP, dimethyl phthalate), dihexyl phthalate, and the like. The plasticizer is contained preferably in a content of 5 to 40% based on a total amount of the erasing tool composition.

The usable filler shall not specifically be restricted as long as the filler is not dissolved in or reacted with vinyl chloride and the plasticizer, and the filler includes, for example, calcium carbonate, magnesium carbonate, magnesium oxide, silica, talc, clay, diatomaceous earth, quartz powder, alumina, alumina silicate, mica, sericite, montmomorillonite, and the like. The filler is contained preferably in a content of 5 to 50% based on a total amount of the erasing tool composition.

In particular, these fillers have preferably a particle diameter of 10 to 200 nm in terms of erasability, toughness and lubricity.

In the erasing tool of the present invention, carbon materials may be contained in terms of further enhancing an erasing force, an erasing feeling and inhibiting deformation if putting no emphasis on a light transmittance, and fiber particles may be contained in terms of an erasing force and inhibiting deformation.

In the above case, the usable carbon materials include, for example, at least one of carbon blacks having such a large particle diameter as not being adsorbed on the petaloid particles described above, carbon fibers, graphite, carbon nanofibers and the like, and carbon materials are contained preferably in a content of 1 to 20% based on a total amount of the erasing tool composition. The above carbon materials having a size (particle size or diameter) of 100 μm or less at most (particle diameter) are preferably used, and the carbon fibers having a length of 200 μm or less are preferably used.

From the viewpoint of enhancing a design property, a chromatic-colored pigment having such a large particle diameter as not being adsorbed on the petaloid particles and a dye which has such a large particle diameter as not being adsorbed on the petaloid particles and which is not dissolved in the plasticizer described above may be contained therein. In the above case, the erasing tool which is not mixed with the above colorant and has a relatively high light transmittance of 30 to 40%, that is, the erasing tool staying in a state where the erasing tool becomes clouded to such an extent that an opposite side is slightly seen through results in enhancing a coloring effect.

The usable fiber particles include, for example, at least one of fiber particles of polyethylene fibers, cellulose fibers, aramid fibers, vinylon fibers, polyamide fibers, polyester fibers, glass fibers, zinc oxide single crystals, and the like, and fiber particles are contained preferably in a content of 1 to 20% based on a total amount of the erasing tool composition. The above fiber particles having a diameter of 20 μm or less at most are preferably used.

Further, in order to prevent, if necessary, various blend agents, for example, the matrix components (particularly, the vinyl chloride resin) from being deteriorated at high temperatures, a heat stabilizer such as, for example, Ca—Zn stearate and epoxidized fatty acid alkyl esters can be used. Also, viscosity modifier, lubricants, solvents, coloring agents, UV absorbers, preservatives, anti-mold agents, aromatics and the like can be blended at suitable amounts.

Further, when rubbers and elastomers are used as the matrix components, softener such as, for example, terpene resins, mineral oils, and sulfur-free rubber substitutes, vulcanizing agents, vulcanization accelerators, fillers, antioxidants, a microcapsule charged with various additives, and the like can be blended at suitable amounts.

The erasing tool of the present invention can be prepared by blending the secondary aggregate having a diameter of 1 to 100 μm with the petaloid particle having the particle diameter described above as the primary particle, the matrix components, the plasticizer, the filler, the carbon material, the fiber particles, and if necessary, the various blending agents described above respectively at predetermined amounts by a usual method and then molding the blended matter into a preferred form.

The form of the erasing tool includes, for example, a bar form, a rectangular form, a cylindrical form, a prismatic form, a triangular form, a quadrangular pyramid form, a fan form and the like. Further, erasing tool can be used in a pen shape holder form and a tape form.

The erasing tool of the present invention can surely erase drawn lines written by pencils, mechanical pencils and the like without staining a paper surface in erasing them, has a high light transmittance, allows a progress for adsorption of even a light color of color pencil leads and the like to be recognized at a glance and produces no eraser crumbs due to the following action mechanism.

That is, the erasing tool of the present invention contains the secondary aggregate having a diameter of 1 to 100 μm with a petaloid particle as a primary particle, for example, a calcium silicate petaloid porous structure as the blend composition, whereby a colorant and the like are adsorbed on the secondary aggregate having a diameter of 1 to 100 μm with a petaloid particle as a primary particle in the erasing tool by rubbing the erasing tool against the drawn lines, and the colorant and the like are erased from the paper surface; the adsorbed colorant and the like are dispersed and renewed by adsorption ability of the secondary aggregate having a diameter of 1 to 100 μm with a petaloid particle as a primary particle to produce no eraser crumbs; in addition, the colorant and the like once adsorbed are not coated again on the paper surface and therefore do not stain the paper surface, and drawn lines can be surely erased; the erasing tool is provided with a light transmittance and therefore allows a progress for adsorption of even a light color of color pencil leads and the like to be recognized at a glance. An erasing tool prepared by using a liquid absorbing porous body such as conventional basic magnesium carbonate is opaque due to particles aggregated in a tubular form, and whenever erased, erased colors are adsorbed and accumulated, so that used to be provided is the problem that adsorption of light colors of erasable color pencils (leads) is difficult to recognize.

Accordingly, the erasing tool of the present invention which transmits light makes it possible to produce an erasing tool excellent in a design property and also produce erasing tools having various colors by adding colorant. Also, the erasing tool transmits light and is not reduced by using to maintain an original form, so that the erasing tool can be easily used up to the end; and the erasing tool produces no eraser crumbs and is excellent in erasability of the drawn lines. In the erasing tool of the present invention, the colorant and the like adsorbed whenever erased are diffused and accumulated in the erasing tool; assuming that, for example, a color of the erasing tool has a light transmittance and that the color of the color pencil lead is light, the color of the erasing tool is increased in a light chromaticity whenever erased.

EXAMPLES

The present invention shall be explained below in further details with reference to examples and comparative examples, but the present invention shall not be restricted to the following examples and the like.

Examples 1 to 15 and Comparative Examples 1 to 5

Example 1

| | |
|---|---|
| FLORITE R ® (particles obtained by aggregating petaloid particles of calcium silicate in a spherical form, diameter: 30 μm, liquid absorption rate: 440 ml/100 g, manufactured by Tomita Pharmaceutical Co., Ltd.) | 10% by mass |
| Polyvinyl chloride (PSH-31, manufactured by Kaneka Corporation | 25% by mass |
| Epoxidized fatty acid alkyl ester (stabilizer) | 1% by mass |
| Dioctyl phthalate (plasticizer) | 39% by mass |
| Dibutyl phthalate (plasticizer) | 25% by mass |

The blend materials described above were mixed by means of a vacuum mixer to prepare a blend composition (paste). The blend composition prepared was poured into a die having a thickness of 10 mm for molding, and the paste was heated at 130° C. for 2 hours while applying a pressure at 200 kg/cm² to obtain an erasing tool (20×54×10 mm, hereinafter the same shall apply).

Example 2

| | |
|---|---|
| FLORITE RT ® (particles obtained by aggregating petaloid particles of calcium silicate, diameter: 30 μm, liquid absorption rate: 400 ml/100 g, manufactured by Tomita Pharmaceutical Co., Ltd.) | 10% by mass |
| Polyvinyl chloride (PSH-31, manufactured by Kaneka Corporation | 25% by mass |
| Epoxidized fatty acid alkyl ester (stabilizer) | 1% by mass |
| Dioctyl phthalate (plasticizer) | 20% by mass |
| Dibutyl phthalate (plasticizer) | 44% by mass |

The blend materials described above were mixed by means of the vacuum mixer to prepare a blend composition (paste), and then the paste was poured into the die for molding and heated at 130° C. for 2 hours while applying a pressure to obtain an erasing tool in the same manner as in Example 1 described above.

Example 3

| | |
|---|---|
| FLORITE R ® used in Example 1 | 10% by mass |
| Polyvinyl chloride (PSH-31, manufactured by Kaneka Corporation | 20% by mass |
| Epoxidized fatty acid alkyl ester (stabilizer) | 1% by mass |
| Acrylic polymer (LP-3202, manufactured by Mitsubishi Rayon Co., Ltd. | 5% by mass |
| Dioctyl phthalate (plasticizer) | 39% by mass |
| Dibutyl phthalate (plasticizer) | 25% by mass |

The blend materials described above were mixed by means of the vacuum mixer to prepare a blend composition (paste), and then the paste was poured into the die for molding and heated at 130° C. for 2 hours while applying a pressure to obtain an erasing tool in the same manner as in Example 1 described above.

Example 4

| | |
|---|---|
| FLORITE R ® used in Example 1 | 10% by mass |
| Polyvinyl chloride (PSH-31, manufactured by Kaneka Corporation | 20% by mass |
| Epoxidized fatty acid alkyl ester (stabilizer) | 1% by mass |
| Cellulose fiber (φ 3 nm, length: 100 μm, manufactured by Nippon Paper Industries Co., Ltd. | 5% by mass |
| Dioctyl phthalate (plasticizer) | 39% by mass |
| Dibutyl phthalate (plasticizer) | 25% by mass |

The blend materials described above were mixed by means of the vacuum mixer to prepare a blend composition (paste). The paste was poured into the die for molding and heated at 130° C. for 2 hours while applying a pressure to obtain an erasing tool.

Example 5

| | |
|---|---|
| FLORITE R ® used in Example 1 | 10% by mass |
| Polyvinyl chloride (PSH-31, manufactured by Kaneka Corporation | 25% by mass |
| Epoxidized fatty acid alkyl ester (stabilizer) | 1% by mass |
| Dioctyl phthalate (plasticizer) | 20% by mass |
| Dibutyl phthalate (plasticizer) | 44% by mass |

The blend materials described above were mixed by means of the vacuum mixer to prepare a blend composition (paste), and then the paste was poured into the die for molding and heated at 130° C. for 2 hours while applying a pressure to obtain an erasing tool in the same manner as in Example 1 described above.

Example 6

| | |
|---|---|
| FLORITE R ® used in Example 1 | 10% by mass |
| Polyvinyl chloride (PSH-31, manufactured by Kaneka Corporation | 20% by mass |
| Epoxidized fatty acid alkyl ester (stabilizer) | 1% by mass |
| Glass fiber (length: 150 μm, manufactured by Nippon Electric Glass Co., Ltd. | 5% by mass |
| Dioctyl phthalate (plasticizer) | 20% by mass |
| Dibutyl phthalate (plasticizer) | 44% by mass |

The blend materials described above were mixed by means of the vacuum mixer to prepare a blend composition (paste), and then it was poured into the die for molding and heated at 130° C. for 2 hours while applying a pressure to obtain an erasing tool in the same manner as in Example 1 described above.

Example 7

| | |
|---|---|
| FLORITE R ® used in Example 1 | 10% by mass |
| Polyvinyl chloride (PSH-31, manufactured by Kaneka Corporation | 20% by mass |
| Epoxidized fatty acid alkyl ester (stabilizer) | 1% by mass |
| Zinc oxide single crystal (Panatetra, manufactured by Panasonic Corporation | 5% by mass |
| Dioctyl phthalate (plasticizer) | 20% by mass |
| Dibutyl phthalate (plasticizer) | 44% by mass |

The blend materials described above were mixed by means of the vacuum mixer to prepare a blend composition (paste), and then the paste was poured into the die for molding and heated at 130° C. for 2 hours while applying a pressure to obtain an erasing tool in the same manner as in Example 1 described above.

Example 8

| | |
|---|---|
| FLORITE R ® used in Example 1 | 10% by mass |
| Polyvinyl chloride (PSH-31, manufactured by Kaneka Corporation | 20% by mass |
| Epoxidized fatty acid alkyl ester (stabilizer) | 1% by mass |
| Sulfur free rubber substitutes | 5% by mass |
| Dioctyl phthalate (plasticizer) | 20% by mass |
| Dibutyl phthalate (plasticizer) | 44% by mass |

The blend materials described above were mixed by means of the vacuum mixer to prepare a blend composition (paste), and then the paste was poured into the die for molding and heated at 130° C. for 2 hours while applying a pressure to obtain an erasing tool in the same manner as in Example 1 described above.

Example 9

| | |
|---|---|
| FLORITE R ® used in Example 1 | 10% by mass |
| Calcium carbonate calcium phosphate composite particles (obtained by aggregating petaloid particles in a spherical form, diameter: 3 μm, liquid absorption rate: 150 ml/100 g, manufactured by Mitsubishi Pencil Co., Ltd.) | 5% by mass |
| Polyvinyl chloride (PSH-31, manufactured by Kaneka Corporation | 20% by mass |
| Epoxidized fatty acid alkyl ester (stabilizer) | 1% by mass |
| Dioctyl phthalate (plasticizer) | 20% by mass |
| Dibutyl phthalate (plasticizer) | 44% by mass |

The blend materials described above were mixed by means of the vacuum mixer to prepare a blend composition (paste), and then the paste was poured into the die for molding and heated at 130° C. for 2 hours while applying a pressure to obtain an erasing tool in the same manner as in Example 1 described above.

Example 10

| | |
|---|---|
| FLORITE R ® used in Example 1 | 15% by mass |
| Polyvinyl chloride (PSH-31, manufactured by Kaneka Corporation | 15% by mass |
| Epoxidized fatty acid alkyl ester (stabilizer) | 1% by mass |
| Dioctyl phthalate (plasticizer) | 30% by mass |
| Dibutyl phthalate (plasticizer) | 39% by mass |

The blend materials described above were mixed by means of the vacuum mixer to prepare a blend composition (paste), and then the paste was poured into the die for molding and heated at 130° C. for 2 hours while applying a pressure to obtain an erasing tool in the same manner as in Example 1 described above.

Example 11

| | |
|---|---|
| FLORITE R ® used in Example 1 | 20% by mass |
| Styrene elastomer (AR-731N, manufactured by Aronkasei Co., Ltd.) | 65% by mass |
| Terpene resin (YS Polyster PX1250, manufactured by Yasuhara Chemical Co., Ltd.) | 10% by mass |
| Mineral oil (SPECTRASYN 4, manufactured Exxon Mobil Yugen Kaisha | 5% by mass |

The blend materials described above were heated and kneaded by means of a kneader to prepare a paste. The paste was poured into a die having a thickness of 10 mm for molding and cooled to obtain an erasing tool.

Example 12

| | |
|---|---|
| FLORITE ® used in Example 1 | 20% by mass |
| Olefin base elastomer (Labaron TE9500C, manufactured by Mitsubishi Chemical Corporation) | 65% by mass |
| Mineral oil (SPECTRASYN 4, manufactured Exxon Mobil Yugen Kaisha | 15% by mass |

The blend materials described above were heated and kneaded by means of the kneader to prepare a paste. The paste was poured into the die having a thickness of 10 mm for molding and cooled to obtain an erasing tool.

Example 13

| | |
|---|---|
| FLORITE R ® used in Example 1 | 20% by mass |
| Polyurethane base elastomer (Ellastran, manufactured by BASF Japan Ltd. | 65% by mass |
| Mineral oil (SPECTRASYN 4, manufactured Exxon Mobil Yugen Kaisha | 15% by mass |

The blend materials described above were heated and kneaded by means of the kneader to prepare a paste. The paste was poured into the die having a thickness of 10 mm for molding and cooled to obtain an erasing tool.

Example 14

| | |
|---|---|
| FLORITE R ® used in Example 1 | 25% by mass |
| Styrene base elastomer (AR-731N, manufactured by Aronkasei Co., Ltd.) | 55% by mass |
| Mineral oil (SPECTRASYN 4, manufactured Exxon Mobil Yugen Kaisha | 20% by mass |

The blend materials described above were heated and kneaded by means of the kneader to prepare a paste. The paste was poured into the die having a thickness of 10 mm for molding and cooled to obtain an erasing tool.

Example 15

| | |
|---|---|
| Calcium carbonate calcium phosphate composite particles (obtained by aggregating petaloid particles in a spherical form, particle diameter: 3 μm, liquid absorption rate: 150 ml/100 g) | 20% by mass |
| Polyvinyl chloride (PSH-31, manufactured by Kaneka Corporation) | 25% by mass |
| Epoxidized fatty acid alkyl ester (stabilizer) | 1% by mass |
| Dioctyl phthalate (plasticizer) | 30% by mass |
| Dibutyl phthalate (plasticizer) | 24% by mass |

The blend materials described above were mixed by means of the vacuum mixer to prepare a blend composition (paste), and then the paste was poured into the die for molding and heated at 130° C. for 2 hours while applying a pressure to obtain an erasing tool in the same manner as in Example 1 described above.

Comparative Example 1

| | |
|---|---|
| Magnesium oxide (Star Mag PSF, manufactured by Konoshima Co., Ltd.) | 25% by mass |
| Polyvinyl chloride (PSH-31, manufactured by Kaneka Corporation | 20% by mass |

| | |
|---|---|
| Epoxidized fatty acid alkyl ester (stabilizer) | 1% by mass |
| Dioctyl phthalate (plasticizer) | 30% by mass |
| Dibutyl phthalate (plasticizer) | 24% by mass |

The blend materials described above were mixed by means of the vacuum mixer to prepare a blend composition (paste), and then the paste was poured into the die for molding and heated at 130° C. for 2 hours while applying a pressure to obtain an erasing tool in the same manner as in Example 1 described above.

Comparative Example 2

| | |
|---|---|
| Calcium carbonate (NEOLIGHT SS, manufactured by Takehara Chemical Co., Ltd.) | 40% by mass |
| Polyvinyl chloride (PSM-154, manufactured by Kaneka Corporation) | 40% by mass |
| Ca—Zn stearate (stabilizer) | 1% by mass |
| Dioctyl phthalate (plasticizer) | 19% by mass |

The blend materials described above were mixed by means of the vacuum mixer to prepare a blend composition (paste), and then the paste was poured into the die for molding and heated at 130° C. for 2 hours while applying a pressure to obtain an erasing tool in the same manner as in Example 1 described above.

Comparative Example 3

| | |
|---|---|
| Glass fiber for FRTP (cut length: 3 mm) | 40% by mass |
| Polyvinyl chloride (PSM-154, manufactured by Kaneka Corporation) | 40% by mass |
| Ca—Zn stearate (stabilizer) | 1% by mass |
| Dioctyl phthalate (plasticizer) | 19% by mass |

The blend materials described above were mixed by means of the vacuum mixer to prepare a blend composition (paste). The paste was poured into the die for molding and heated at 130° C. for 2 hours while applying a pressure to obtain an erasing tool.

Comparative Example 4

| | |
|---|---|
| Calcium carbonate (NEOLIGHT SS, manufactured by Takehara Chemical Co., Ltd.) | 39% by mass |
| Styrene elastomer (AR-731N, manufactured by Aronkasei Co., Ltd.) | 50% by mass |
| Epoxidized fatty acid alkyl ester (stabilizer) | 1% by mass |
| Mineral oil | 10% by mass |

The blend materials described above were heated and kneaded by means of the kneader to prepare a paste. The paste was poured into the die having a thickness of 10 mm for molding and cooled to obtain an erasing tool.

Comparative Example 5

| | |
|---|---|
| Mag Tube (liquid absorbing porous body, particles obtained by aggregating flaky fine crystals of basic magnesium carbonate in a tubular form, outer diameter: 3.5 μm, length: 20 μm, inner diameter: 1 μm, specific surface area: 150 m$^2$/g, liquid absorption rate: 300 ml/100 g, manufactured by Nittetsu Mining Co., Ltd.) | 10% by mass |
| Polyvinyl chloride (PSH-31, manufactured by Kaneka Corporation) | 25% by mass |
| Epoxidized fatty acid alkyl ester (stabilizer) | 1% by mass |
| Dioctyl phthalate (plasticizer) | 39% by mass |
| Dibutyl phthalate (plasticizer) | 25% by mass |

The blend materials described above were mixed by means of the vacuum mixer to prepare a blend composition (paste), and then the paste was poured into the die for molding and heated at 130° C. for 2 hours while applying a pressure to obtain an erasing tool in the same manner as in Example 1 described above.

The erasing tools obtained in Examples 1 to 15 and Comparative Examples 1 to 5 described above were used to evaluate an erasing rate, weight change, the presence of eraser crumbs, a light transmittance, and a progress for adsorption of drawn lines of color pencil lead by the following evaluation methods. The results thereof are shown in the following Table 1.

(Evaluation Method of the Erasing Rate)

The erasing rate (four reciprocations) was measured according to E (character erasion rate=erasing rate)=(1−M/C)−100 (M: intensity of an erased part, C: intensity of a colored part) based on a plastic erasing ability (character erasion rate) disclosed in JIS S 6050-2008. It is shown that the higher the numeral value of the erasion rate is, the better erasability is. A pencil HB prescribed in JIS S 6006 is used in JIS S 6050-2008, but in the present evaluation, a color pencil of "Lemon Yellow" of Uni ARTERASE COLOR (manufactured by Mitsubishi Pencil Co., Ltd.) was used.

(Evaluation Method of the Weight Change)

A weight change amount in the erasing tool before and after the measuring test of the erasing rate described above was measured. When a change (mg) in the weight is a positive value, the change shows an adsorbed amount, and when the weight is a negative value, the change shows an amount of eraser crumbs.

The presence of the eraser crumbs was visually confirmed in evaluating the erasing rate described above.

(Evaluation Method of the Light Transmittance)

A piece of the erasing tool having a thickness of 0.25 mm was measured by means of a UV visible light infrared spectrophotometer (U-3300, manufactured by Hitachi, Ltd.). An iodine tungsten lamp (750 nm) was used for a light source. When the light transmittance (%) is 0 (zero), the erasing tool is opaque, and the higher the value is, the erasing tool is transparent.

(Evaluation Method of the Progress for Adsorption of the Color Pencil Lead Drawn Lines)

The erasing tool used in the evaluation of the erasing rate described above was left standing one day and was evaluated sensory whether a hue of the "Lemon Yellow" is spread into the erasing tool by the following evaluation criteria.

Evaluation criteria:
- A: it could be observed that the hue of the "Lemon Yellow" was spread homogeneously in the erasing tool.
- B: it could be observed that the hue of the "Lemon Yellow" was spread gradually from an erased surface to an inside in the erasing tool.
- C: it could be observed that the hue of the "Lemon Yellow" as adhered to a surface of the erasing tool, but it could not be observed that the hue was spread into an inside.
- D: the "Lemon Yellow" could scarcely be observed either on a surface of the erasing tool or in an inside.

TABLE 1

|  |  | Erasing rate (%) | Change in weight (mg) | Crumb formation | Transmittance (%) | Adsorption of color pencil lead |
|---|---|---|---|---|---|---|
| Example | 1 | 91.8 | 0.5 | no | 39.8 | A |
|  | 2 | 94.6 | 0.1 | no | 39.6 | A |
|  | 3 | 93.0 | 0.3 | no | 36.2 | A |
|  | 4 | 95.2 | 0.5 | no | 36.1 | A |
|  | 5 | 95.7 | 0.5 | no | 37.3 | A |
|  | 6 | 92.6 | 0.3 | no | 35.5 | A |
|  | 7 | 94.7 | 0.6 | no | 38.2 | A |
|  | 8 | 93.9 | 0.4 | no | 37.5 | A |
|  | 9 | 94.0 | 0.3 | no | 36.2 | A |
|  | 10 | 91.2 | 1.5 | yes (a little) | 38.4 | A |
|  | 11 | 92.5 | 0.6 | no | 37.9 | B |
|  | 12 | 91.3 | 0.4 | no | 36.3 | B |
|  | 13 | 90.4 | 0.4 | no | 36.8 | B |
|  | 14 | 91.0 | 1.5 | yes (a little) | 38.1 | B |
|  | 15 | 90.4 | 0.1 | no | 37.4 | A |
| Comparative Example | 1 | 91.3 | 19 | yes | 0 | C |
|  | 2 | 93.5 | 17 | yes | 0 | D |
|  | 3 | 95.9 | 20 | yes | 0 | D |
|  | 4 | 92.4 | 18 | yes | 0 | C |
|  | 5 | 97.6 | 0.1 | no | 0 | D |

As apparent from the results shown in Table 1, it has become clear that the erasing tools prepared in Examples 1 to 15 in the scope of the present invention produce no eraser crumbs, can allow even a light color of color pencil leads and the like to be recognized at a glance, make it possible to surely erase the color of color pencil lead and have a high light transmittance as compared with evaluations prepared in Comparative Examples 1 to 5 outside the scope of the present invention.

INDUSTRIAL APPLICABILITY

The erasing tools of the present invention can suitably be for erasing drawn lines written by color pencils, pencils, mechanical pencils and the like.

The invention claimed is:
1. An erasing tool which produces no eraser crumbs, wherein the erasing tool contains a secondary aggregate comprising a calcium silicate petaloid particle having a diameter of 1 to 100 μm with a petaloid particle as a primary particle, whereby a colorant is adsorbed on the secondary aggregate in the erasing tool by rubbing the erasing tool against drawn lines, and the colorant is erased from a paper surface.
2. The erasing tool as described in claim 1, further containing matrix components, a plasticizer and a filler.
3. The erasing tool as described in claim 1, wherein the primary particle is a gyrolight form calcium silicate having a petaloid structure.

* * * * *